(12) United States Patent
Lindemann et al.

(10) Patent No.: US 6,563,093 B2
(45) Date of Patent: May 13, 2003

(54) CERAMIC PIN HEATING ELEMENT WITH INTEGRATED CONNECTOR CONTACTS AND METHOD FOR MAKING SAME

(75) Inventors: Gert Lindemann, Lichtenstein (DE); Wilfried Aichele, Winnenden (DE); Friederike Lindner, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/874,765

(22) Filed: Jun. 5, 2001

(65) Prior Publication Data

US 2001/0026035 A1 Oct. 4, 2001

Related U.S. Application Data

(62) Division of application No. 09/339,309, filed on Jun. 23, 1999, now Pat. No. 6,274,079.

(51) Int. Cl.$^7$ .................................................. H05B 3/10
(52) U.S. Cl. .................. 219/544; 219/270; 219/541; 219/548; 219/553
(58) Field of Search .............................. 264/614, 618, 264/642, 645, 328.2; 219/548, 270, 267, 553, 541, 544

(56) References Cited

U.S. PATENT DOCUMENTS

| | | |
|---|---|---|
| 2,030,937 A | 2/1936 | Reichmann |
| 2,305,877 A | 12/1942 | Klingler et al. |
| 4,634,837 A | 1/1987 | Atsumi et al. |
| 4,929,813 A | 5/1990 | Massaka et al. |
| 5,189,280 A | 2/1993 | Okazaki et al. |
| 5,853,652 A | 12/1998 | Schlidgen et al. |
| 5,948,306 A | 9/1999 | Konishi et al. |
| 5,993,722 A | 11/1999 | Radmacher |
| 6,143,238 A * | 11/2000 | Konishi et al. ............. 264/614 |
| 6,274,079 B1 * | 8/2001 | Lindemann et al. ......... 264/614 |
| 6,309,589 B1 * | 10/2001 | Knoll et al. ................ 264/614 |

FOREIGN PATENT DOCUMENTS

| | | |
|---|---|---|
| DE | 198 60 919 | 2/2000 |
| DE | 198 57 958 | 6/2000 |
| WO | WO 97 38811 | 10/1997 |

OTHER PUBLICATIONS

Machine Translation of JP Pub. 08268760 10/96.*
Patent Abstract of Japan, vol. 1997, No. 2, Feb. 28, 1997.
International Search Report (Oct. 4, 2000) for PCT/EP00/05876 (which claims priority to U.S. patent application Ser. No. 09/339,309.

* cited by examiner

Primary Examiner—James Derrington
(74) Attorney, Agent, or Firm—Kenyon & Kenyon

(57) ABSTRACT

A ceramic pin heating element having exterior heating conductors and integrated electrical connection surfaces, and method for making same. A first body is injection molded from a first injection-moldable ceramic composite compound having a first electrical resistance, and a second body is injection-molded from a second injection-moldable ceramic composite compound having a second electrical resistance about the first body so as to form a compound body. The compound body is then sintered. The resulting ceramic pin heating element is directly formed without additional steps for protecting (insulating) the element so as to prevent the exterior, complementary heating conductors from contacting the housing and/or terminal bolts. The danger of breakage of the pins at the mounting location and/or at the seal seat through variations in the thickness of contact and/or insulation coatings is minimized.

28 Claims, 2 Drawing Sheets

CERAMIC PIN HEATING ELEMENT WITH INTEGRATED CONNECTOR CONTACTS AND METHOD FOR MAKING SAME

This application is a division of U.S. patent application Ser. No. 09/339,309 filed Jun. 23, 1999 now U.S. Pat. No. 6,274,079.

FIELD OF THE INVENTION

The present invention relates to ceramic pin heating elements, and in particular, to a ceramic pin heating element for an internal combustion engine, the pin heating element having integrated connector contacts.

BACKGROUND INFORMATION

Connection of ceramic pin heating elements having exterior heating element shafts in a metal housing with simultaneous sealing from the combustion chamber is complex. The installation position causes contact between the heating element shafts having different polarity and the grounded housing. Therefore, to avoid short circuits, one of the two heating element shafts must be electrically insulated from the housing in the area of the seal seat. Also, the other heating element shaft, having opposite polarity, must be electrically insulated from the connector bolt. The application of electrical insulation layers is currently implemented through separate vitrification steps or through application, for example by printing, and burning-in of electrically insulating layers. To avoid one-sided mechanical stresses of the installed pin heating element due to the applied insulation layers, the corresponding open connector shaft is also provided with a layer of the same thickness but with electrical conductive properties, since there might otherwise be a danger of breakage of the ceramic pin heating element in the area of the seal seat. Another possibility is for the ceramic pin heating element to be fully insulated from the housing through application of a coating. As with a potential-free A-probe, contact is made through a divided terminal bolt.

SUMMARY OF THE INVENTION

The present invention provides a method for making a ceramic pin heating element having exterior conductors and integrated electrical connection surfaces. The method comprises injection molding a first body from a first injection-moldable ceramic composite compound having a first electrical resistance; injection molding a second injection-moldable ceramic composite compound having a second electrical resistance about the first body so as to form a compound body; and sintering the compound body.

The present invention also provides a ceramic pin heating element comprising a first body injection molded from a first injection-moldable ceramic composite compound, the first body having a first electrical resistance, and a second body injection molded from a second injection-moldable ceramic composite compound, the second body having a second electrical resistance. The first body and second body form a compound body, the compound body being sintered after injection molding of the first body and the second body.

A ceramic pin heating element according to an embodiment of the present invention has exterior heating conductors based on $Si_3N_4/MSi_2$, where M is at least one of Mo, Nb, Ti and W, and has integrated electrical connection surfaces using multiple-component injection-molding technology.

An advantage of the method and heating element of the present invention is direct shaping of the pin heating element without additional steps for protecting (insulating) the element so as to prevent the exterior, complementary heating conductors from contacting the housing and/or terminal bolts. Another advantage according to the present invention is minimization of the danger of breakage of the pins at the mounting location and/or at the seal seat through variations in the thickness of contact and/or insulation coatings.

DETAILED DESCRIPTION

Figure 1D:
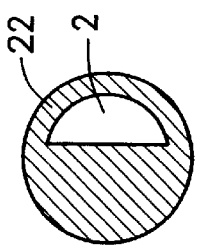
FIG. 1D shows a cross-section through line D—D of FIG. 1A.
Figure 1B:
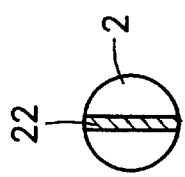
FIG. 1B shows a cross-section through line B—B of FIG. 1A.
Figure 1C:
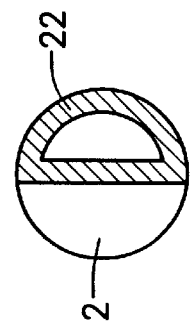
FIG. 1C shows a cross-section through line C—C of FIG. 1A.
Figure 1A:
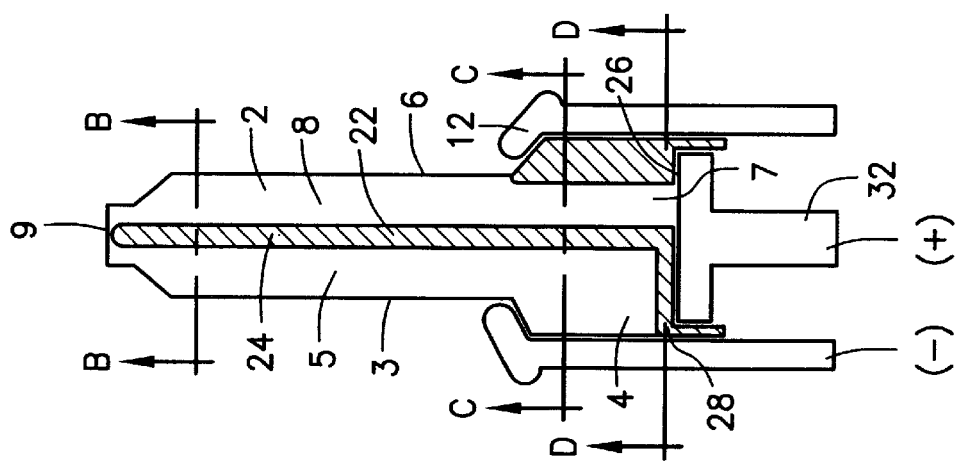
FIG. 1A shows a schematic cross-sectional view of a ceramic pin heating element according to the present invention.

Referring to FIG. 1A, an exemplary ceramic pin heating element of the present invention includes a heating conductor 2, a housing 12, an insulator body 22 and a connector bolt 32. Heating conductor 2 has a negative pole 3, a positive pole 6 and a tip 9, which is heated during operation of the heating element. Negative pole 3 has a lower section 4 disposed in housing 12, and a generally semi-cylindrical upper section 5 projecting from housing 12. Positive pole 6 has a lower section 7 disposed in housing 12, and a generally semi-cylindrical upper section 8 projecting from housing 12. Housing 12 forms a generally cylindrical, annular casing around lower sections 4 and 7 of negative pole 3 and positive pole 6, respectively, and around portions of insulator 22. Insulator 22 has a generally cylindrical stem section 24 encased by negative pole 3 and positive pole 6, a curved section 26 disposed between housing 12 and a portion of lower section 4 of negative pole 3, and a semi-disc shaped section 28 disposed between connection bolt 32 and lower section 4 of negative pole 3. As embodied herein, connection bolt 32 is electrically connected to positive pole 6 and housing 12 is electrically connected to negative pole 3.

Heating conductor 2 is made of an injection-moldable ceramic composite compound having a relatively high conductivity. Insulator 22 is made of an injection-moldable ceramic composite compound having a relatively low conductivity. Thus, one of the injection-moldable ceramic composite compounds having a relatively high conductivity is substantially conductive, and the other one of the injection-moldable ceramic composite compounds having a relatively low conductivity is substantially insulative. Housing 12 is preferably made of free-cutting steel. Alternatively, housing 12 may be made of other suitable metals or materials. Connector bolt 8 is also preferably also made of free-cutting steel, but may also be made of other suitable metals or materials. FIGS. 1B–1D show cross-sectional views through the heating element of FIG. 1A at various levels.

Figure 2:
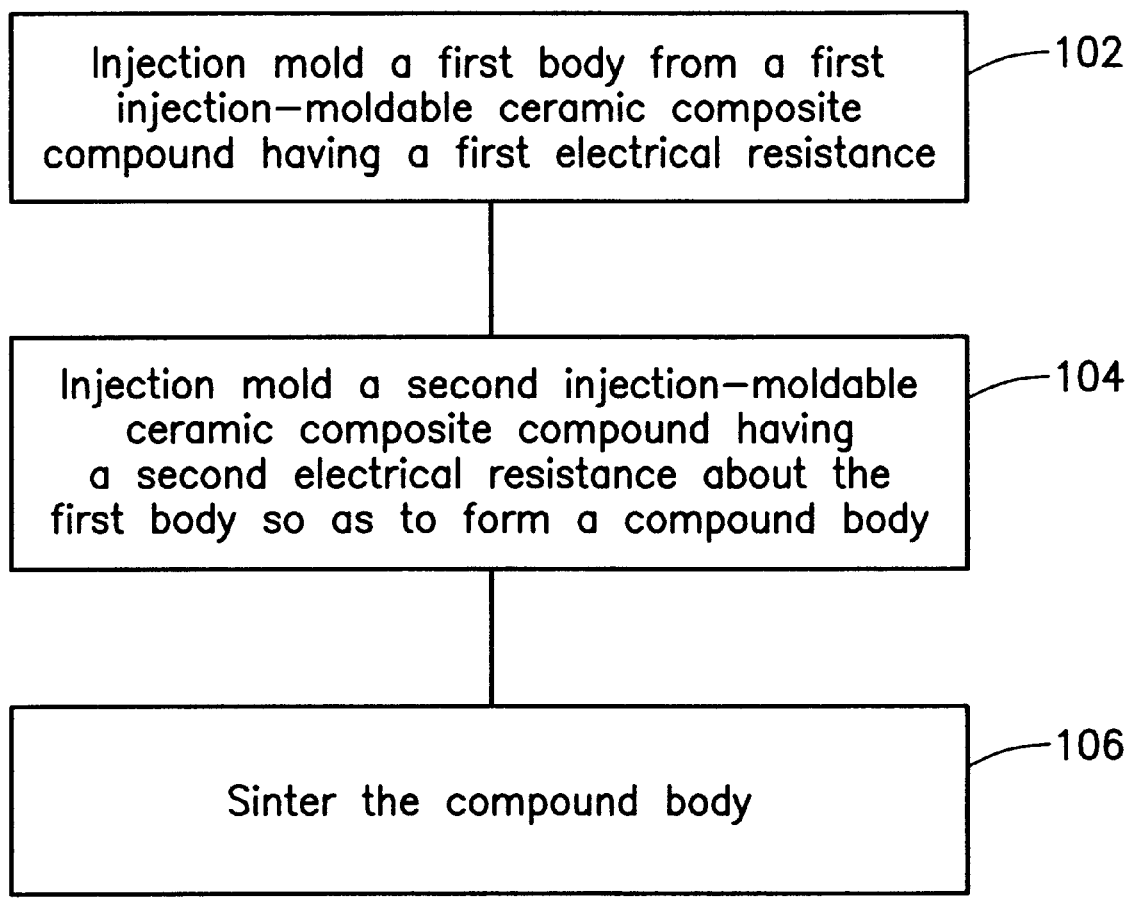
FIG. 2 shows a flow chart of a method according to the present invention.

Referring now to FIG. 2, an exemplary method according to the present invention includes injection molding a first body from a first injection-moldable ceramic composite compound having a first electrical resistance, as shown in block 102. As shown in block 104, the next step of an exemplary method of the present invention is injection molding a second injection-moldable ceramic composite compound having a second electrical resistance about the first body so as to form a compound body. The first body may form heating element 2 or, alternatively, insulator body 22 of the ceramic pin heating element, while the second injection-moldable ceramic composite makes up, respectively, insulator body 22 or heating element 2. Sintering the compound body is then performed, as shown in block 106.

The ceramic pin heater is produced using suitable organic process aids. As embodied herein, suitable process aids include grafted polypropylene, such as POLYBOND 1001 made by Uniroyal Chemical company, in combination with cyclododecane and/or cyclododecanol. Other suitable organic process aids include combinations of polyolefin waxes, such as HOSTAMONT TPEK 583 made by the firm Ticone GmbH, or of polyoxymethylene, such as CATAMOLD made by the firm BASF AG. The suitable organic process aid(s) are added to composites $Si_3N_4/MSi_2$ (where M is at least one of Mo, Nb, W and Ti), the composites having differing specific electrical resistances following sintering. The composites are then formed into molded bodies through injection molding. The sintering is then performed, preferably as a two-step sintering process including a presintering and a primary sintering step.

A method in accordance with the present invention uses a preconditioned $Si_3N_4$ powder with appropriate sintering additives such as $Al_2O_3$, $Y_2O_3$, and the like and an admixture of $MSi_2$ (M: Mo, Nb, W, Ti) in differing proportions. The admixture of $MSi_2$ is such that a component A, which is highly insulating following the sintering fire, and a very highly conductive component B, are created.

Injection-moldable compounds AS and BS are prepared from the preconditioned ceramic powder mixtures A and B with a suitable organic binder system which according to an exemplary embodiment of the present invention is composed of grafted polypropylene in combination with cyclododecane and/or cyclododecanol.

An insulation body made of compound AS is formed by injection molding. A conductive compound BS is injection molded around the insulation body AS, for example in the two-component injection molding procedure.

Debinding and presintering is performed under an inert gas at a pressure of 1 bar and a temperature of up to 900° C. A primary sintering process follows the forming process after debinding and presintering. Primary sintering occurs under a defined $N_2$ partial pressure with the $N_2$ partial pressure being not higher than 10 bar and the total sintering pressure being elevated through addition of an inert gas, such as, for example, Ar, to values up to 100 bar, the sintering gas being at a temperature between 1000° C. and the sintering temperature which is no higher than 1900° C.

Alternatively, primary sintering is performed under a defined $N_2$ partial pressure with the $N_2$ partial pressure varied with the temperature so that the partial pressure is within a range which is bounded by the following relationships and the total sintering pressure being elevated through addition of an inert gas, such as, for example, Ar, to values up to 100 bar:

Upper limit: $\log p(N_2) = 7.1566 \cdot \ln(T) - 52.719$
Lower limit: $\log p(N_2) = 9.8279 \cdot \ln(T) - 73.988$.

Where T is the sintering temperature in ° C. and $p(N_2)$ is the partial pressure of $N_2$ in bar. The sintering temperature is no higher than 1900° C.

The electrical contact surfaces may also be provided with a thin metal coating such as one based on Ni or the like.

In an exemplary embodiment of the present invention a composite powder A of 54 wt % $Si_3N_4$, 2.58 wt % $Al_2O_3$, 3.42 wt % $Y_2O_3$, and 40 wt % $MoSi_2$ and a composite powder B of 36 wt % $Si_3N_4$, 1.72 wt % $Al_2O_3$, 2.28 wt % $Y_2O_3$, and 60 wt % $MoSi_2$ are produced. The mean particle size of the $Si_3N_4$ used is 0.7 $\mu$m, and that of the $MoSi_2$ used is 1.8 $\mu$m. From these composite powders, injection-moldable compounds AS and BS are produced. Injection-moldable powder compounds represent highly filled dispersions.

A binder system suitable for powder injection molding preferably meets the following requirements: (1) dispersion effect for avoidance of clumping of powder; (2) good flow quality of the compounds during injection molding; (3) adequate bonding of a second compound injected over a blank; (4) low formation of pyrolysis carbon during thermal debinding in inert gas atmosphere and in air, since carbon negatively influences the properties of the sintered molded body; and (5) rapid debinding without formation of defects.

The combination of grafted polypropylenes and cyclododecane and/or cyclododecanol in accordance with a method of the present invention, for example, represents a binder system of this type. The polar compounds grafted onto the polypropylene chain such as acrylic acid or maleic acid anhydride attach to the surfaces of the powder. The polypropylene POLYBOND 1001 used in the present exemplary embodiment is a homo-polypropylene grafted with 6% acrylic acid of the company Uniroyal Chemical.

For production of the compound BS from the conductive ceramic, 82 wt % of preconditioned powder mixture B is kneaded with 12 wt % POLYBOND 1001 and 6 wt % cyclododecane under protective gas at 180° C. and is granulated through cooling with the kneader running.

In this way, a compound AS is produced from the insulating ceramic powder A, the filler content of which is matched to that of the compound BS such that test bodies injection molded and debinded from both compounds under the same sintering conditions have the same sintering shrinkage.

First the conductive body is formed with the compound BS through two-component injection molding. After withdrawal or change of the pusher which forms the recesses for the insulation areas in the injection molding tool, the voids formed are injected with the compound AS. In this process, a bond develops between the insulating body and the conductive path.

After thermal debinding and sintering according to sintering conditions 2, the AS component has a specific resistance of 107 $\omega$cm and the BS component has a specific resistance of $6 \ast 10^{-3}$ $\Omega$cm.

What is claimed is:

1. A ceramic pin heating element comprising:
   a housing;
   a connector arrangement;
   a first body injection molded from a first injection-moldable ceramic composite compound having a first electrical resistance; and
   a second body injection molded from a second injection-moldable ceramic composite compound having a second electrical resistance about the first, wherein a compound body is formed by the second body injection molded about the first body, and wherein the compound body is sintered;
   wherein:
      the first electrical resistance and the second electrical resistance differ, one of the first body and the second body is a heating conductor having a negative pole and a positive pole, the second body is an insulator if the first body is the heating conductor, and the first body is the insulator if the second body is the heating conductor, the negative pole has a first lower section disposed in the housing, and a generally semi-cylindrical upper section projecting from the housing, the positive pole has a second lower section disposed in the housing, and a generally semi-cylindrical upper section projecting from the housing, the housing forms an annular casing around the first and second lower sections of the negative pole and the positive pole and around at least a portion of the insulator, and the connector arrangement and the housing are electrically connected to the positive pole and the negative pole.

2. The ceramic heating pin element of claim 1, wherein the insulator has at least one of a generally cylindrical stem section encased by the negative pole and the positive pole, a curved section disposed between the housing and a portion of the first lower section of the negative pole, and a semi-disc shaped section disposed between the connector arrangement and the first lower section of the negative pole.

3. The ceramic heating pin element of claim 1, wherein the insulator has a generally cylindrical stem section encased by the negative pole and the positive pole, and at least one of a curved section disposed between the housing and a portion of the first lower section of the negative pole, and a semi-disc shaped section disposed between the connector arrangement and the first lower section of the negative pole.

4. The ceramic heating pin element of claim 1, wherein the first injection-moldable ceramic composite compound includes trisilicon tetranitride, a first metal silicide and a first binder system, and wherein the second injection-moldable ceramic composite compound includes trisilicon tetranitride, a second metal silicide and a second binder system.

5. The ceramic heating pin element of claim 4, wherein at least one of the first and second binder systems includes at least one grafted polypropylene and at least one of cyclododecane and dyclodecanol.

6. The ceramic heating pin element of claim 5, wherein the at least one grafted polypropylene includes a homopolypropylene grafted with 6% acrylic acid.

7. The ceramic heating pin element of claim 4, wherein the first metal silicide is of the form $(M1)Si_2$, (M1) being a metal selected from Mo, Nb, W, and Ti, and wherein the second metal silicide is of the form $(M2)Si_2$, (M2) being a metal selected from Mo, Nb, W, and Ti.

8. The ceramic heating pin element of claim 4, wherein the first and second metal silicides are the same metal silicide.

9. The ceramic heating pin element of claim 4, wherein the first injection-moldable composite compound includes a first sintering additive and the second injection-moldable composite compound includes a second sintering additive, at least one of the first and second sintering additives including at least one of $Al_2O_3$ and $Y_2O_3$.

10. The ceramic heating pin element of claim 1, wherein the compound body is pre-sintered.

11. The ceramic heating pin element of claim 10, wherein the presintering takes place at atmospheric pressure under an inert gas at a maximum temperature of 900 degrees C.

12. The ceramic heating pin element of claim 1, wherein the sintering takes place under a nitrogen partial pressure, a maximum value of the nitrogen partial pressure being 10 bar when a temperature of the sintering is between 1000 degrees C. and 1900 degrees C.

13. The ceramic heating pin element of claim 1, wherein a temperature of the sintering is a maximum of 1900 degrees C.

14. The ceramic heating pin element of claim 1, wherein the compound body is debinded.

15. The ceramic heating pin element of claim 1, wherein at least a portion of the electrical connection surfaces is coated with a metal coating.

16. The ceramic heating pin element of claim 1, wherein:
the first injection-moldable ceramic composite compound includes trisilicon tetranitride, a first metal silicide and a first binder system, and the second injection-moldable ceramic composite compound includes trisilicon tetranitride, a second metal silicide and a second binder system;

at least one of the first and second binder systems includes at least one grafted polypropylene and at least one of cyclododecane and dyclodecanol; and the first metal silicide is of the form $(M1)Si_2$, (M1) being a metal selected from Mo, Nb, W, and Ti, and the second metal silicide is of the form $(M2)Si_2$, (M2) being a metal selected from Mo, Nb, W, and Ti.

17. The ceramic heating pin element of claim 16, wherein the at least one grafted polypropylene includes a homopolypropylene grafted with 6% acrylic acid.

18. The ceramic heating pin element of claim 1, wherein:
the first injection-moldable ceramic composite compound includes trisilicon tetranitride, a first metal silicide and a first binder system, and the second injection-moldable ceramic composite compound includes trisilicon tetranitride, a second metal silicide and a second binder system;

the first and second metal silicides are the same metal silicide;

the first injection-moldable composite compound includes a first sintering additive and the second injection-moldable composite compound includes a second sintering additive, at least one of the first and second sintering additives including at least one of $Al_2O_3$ and $Y_2O_3$.

19. The ceramic heating pin element of claim 1, wherein the heating conductor has a tip.

20. The ceramic heating pin element of claim 1, wherein the heating conductor has a tip, and the tip is heatable during operation of the ceramic heating pin element.

21. The ceramic heating pin element of claim 1, wherein the housing forms a generally cylindrical, annular casing around the first and second lower sections of the negative pole and the positive pole, respectively, and around at least a portion of the insulator.

22. The ceramic heating pin element of claim 1, wherein the insulator has a generally cylindrical stem section encased by the negative pole and the positive pole.

23. The ceramic heating pin element of claim 1, wherein at least one of the housing and the connector arrangement is made of steel.

24. The ceramic heating pin element of claim 1, wherein at least one of the housing and the connector arrangement is made of free-cutting steel.

25. The ceramic heating pin element of claim 1, wherein the insulator has a section disposed between the housing and a portion of the first lower section of the negative pole.

26. The ceramic heating pin element of claim 1, wherein the insulator has a semi-disc shaped section disposed between the connector arrangement and the first lower section of the negative pole.

27. The ceramic heating pin element of claim 1, wherein the housing forms a generally cylindrical, annular casing around the first and second lower sections.

28. The ceramic heating pin element of claim 1, wherein the insulator has a generally cylindrical stem section encased by the negative pole and the positive pole, a curved section disposed between the housing and a portion of the first lower section of the negative pole, and a semi-disc shaped section disposed between the connection bolt and the first lower section of the negative pole.

* * * * *

UNITED STATES PATENT AND TRADEMARK OFFICE
CERTIFICATE OF CORRECTION

PATENT NO. : 6,563,093 B2
DATED : May 13, 2003
INVENTOR(S) : Lindemann et al.

It is certified that error appears in the above-identified patent and that said Letters Patent is hereby corrected as shown below:

<u>Column 4,</u>
Line 49, change "107ωcm" to -- $10^7 \Omega cm$ --

Signed and Sealed this

Sixth Day of July, 2004

JON W. DUDAS
*Acting Director of the United States Patent and Trademark Office*